PSEUDOHYBRID MICROWAVE DEVICES

Filed Aug. 14, 1957 5 Sheets-Sheet 1

INVENTOR
E. A. J. MARCATILI
BY Roy M. Porter Jr.
ATTORNEY

Nov. 7, 1961 E. A. J. MARCATILI 3,008,099

PSEUDOHYBRID MICROWAVE DEVICES

Filed Aug. 14, 1957 5 Sheets-Sheet 2

INVENTOR
E. A. J. MARCATILI
BY Roy M. Porter, Jr.
ATTORNEY

INVENTOR
E. A. J. MARCATILI
BY Roy M. Porter, Jr.
ATTORNEY

INVENTOR
E. A. J. MARCATILI
BY Roy M. Porter, Jr.
ATTORNEY

INVENTOR
E. A. J. MARCATILI
BY Roy M. Porter, Jr.
ATTORNEY

United States Patent Office 3,008,099

Patented Nov. 7, 1961

3,008,099

PSEUDOHYBRID MICROWAVE DEVICES

Enrique A. J. Marcatili, Fair Haven, N.J., assignor to Bell Telephone Laboratories, Incorporated, New York, N.Y., a corporation of New York

Filed Aug. 14, 1957, Ser. No. 678,182
8 Claims. (Cl. 333—9)

This invention relates to asymmetric electromagnetic power dividing networks and more particularly to asymmetrically conjugately coupled waveguides, and the use of such networks in improved microwave filters.

The four-branch microwave junction known as the microwave hybrid or "magic T" is now a familiar and useful component in the transmission art. The basic property of conjugacy, of this four-branch junction, is such that micro-wave energy, over a broad frequency band, when applied to any one of the four branches divides equally between two others with no energy appearing at the fourth. This fourth branch is, therefore, said to be balanced or conjugate with respect to the first branch. In the T type hybrid junction, this balance is a direct result of the physical configuration of the branches, in which two of the branches forming one pair of conjugate arms intersect at right angles to each other, and in addition, are perpendicular to the remaining two branches which form a second pair of conjugate arms. Because of the symmetrical arrangement, the aligned or colinear branches also display the property of electrical conjugacy as between themselves.

In United States Patent 2,649,576, granted August 18, 1953, to W. D. Lewis, a new type of microwave junction was disclosed. This type of junction is basically a "magic T" type hybrid in which one pair of conjugately coupled arms is loosely coupled to the second pair of conjugate arms. By so coupling the pairs of conjugate arms, certain properties of the "magic T" hybrid are modified, and as a consequence gives rise to a new class of power-dividing network. Because there are similarities between the two types of power-dividing networks, however, the new network has been designated a "pseudohybrid." In one type of pseudohybrid arrangement, the mutually perpendicular arms are loosely coupled to the aligned arms. Whereas all the energy entering one of the aligned arms in a "magic T" would divide equally in the perpendicular arms, resulting in no energy leaving through the second aligned arm, the situation in the pseudohybrid is considerably different. In the pseudohybrid, energy entering one of the aligned arms will pass out the second aligned arm essentially undiminished. There will be some transfer of energy equally to each of the loosely coupled arms, but in general the coupling will be small and the energy transfer will be small.

Essentially all the energy however may be extracted from the loosely coupled arms, by resonating them at the frequency to be extracted. At this resonant frequency, the pseudohybrid appears to perform as an ordinary hybrid. Remote from resonance, however, the loosely coupled arms will be isolated from the aligned branches and from each other so that all energy applied to one of the aligned branches will pass out the other, while energy applied to either of the mutually perpendicular branches will be reflected. Because of the ability of the pseudohybrid to pass energy through the aligned arms at frequencies remote from resonance, this pair of arms will be referred to as the through-guide.

Applications of the unusual coupling property of such a network are described in the above-mentioned patent to W. D. Lewis.

The "T" type pseudohybrid like the "T" type hybrid, achieves its balanced properties by virtue of its balanced physical configuration, the mutually perpendicular conjugately coupled arms being symmetrically situated with respect to the aligned conjugately coupled arms. This very physical property which gives rise to these useful energy transferring properties, however, is the very property which most limits the usefulness of this type of power-dividing network. For, by having one pair of conjugate arms both perpendicular to each other and to the other pair of conjugate arms, there obtains a class of power-dividing networks having an extremely awkward spacial configuration. Such a configuration does not lend itself readily to systems or devices in which size and compactness are important considerations.

It has been discovered, however, that asymmetric pseudohybrid arrangements are possible, thereby greatly enhancing the utility of this type of device.

It is, therefore, an object of the present invention to extend the usefulness of pseudohybrid arrangements by eliminating the need for spacial perpendicularness between its branches.

It is a more specific object to conjugately couple electromagnetic energy within a finite band of frequency among waveguides in an asymmetrical structure.

In accordance with the invention, the loosely coupled terminals forming one pair of conjungately coupled arms do not necessarily intersect but instead are arranged contiguous to a region of a wide wall and a region of a narrow wall of the through-guide, the latter constituting the second pair of conjugately related arms. To assure the conjugacy of the two pairs of arms so arranged, it being noted that the physical balance or symmetry formerly enjoyed by the prior art structures no longer exists, it is necessary that one of the loosely coupled arms couple exclusively to a transverse component of magnetic field in the through-guide and that the second loosely coupled arm couple exclusively to a longitudinal component of this magnetic field. In a particular embodiment to be illustrated, coupling, therefore, is accomplished through a small aperture in each of the common wall regions, where the centers of the coupling apertures are preferably located in a common transverse plane. To establish maximum transverse and longitudinal magnetic field components at the respective apertures, and to exclude the possibility of any electric field coupling which would unbalance the induced energy waves a standing wave pattern is established in the loosely coupled conjugate guides by terminating one end of each of these guides in a short circuit. The shorting terminations are located at an appropriate distance from the coupling apertures, these distances being related to the frequency at which the pseudohybrid is to exhibit "magic T" properties, i.e., that frequency at which energy is to be conjugately extracted from the through-guide.

If, now, the loosely coupled arms are caused to resonate at the frequency represented by the spacing of the shorting planes from the respective apertures, a band of frequencies centered about such frequency applied at the input of the through-guide will be extracted in equal amounts by the loosely coupled arms, and no energy at these frequencies will appear at the output terminal. Similarly, if energy at these frequencies, is introduced into the loosely coupled resonant arms in equal amounts, such energy will be conjugately coupled from each of said arms to the two arms of the through-guide, reinforcing in one direction, and destructively interfering in the other direction. All the energy, as a consequence, will leave through one of the terminals as in the ordinary hybrid.

While the axes of the loosely coupled arms may make any angle with the axis of the through-guide in the most general case, a particularly useful pseudohybrid which represents a preferred embodiment of applicant's invention is obtained when all three axes are parallel. The power dividing network so arranged, and described in detail below, has been designated a "parallel arm pseudohybrid."

The separation of many frequency bands from a waveguide may be performed with devices which, because of their function, are called channel-dropping filters. Such devices may be constructed utilizing the four-branched hybrid junctions of the prior art, such as the so-called "magic T" waveguide junction, described above, or others. One possible arrangement comprises two "magic T" hybrid junctions adequately connected by two identical band-pass filters. As is well understood by those skilled in the art, that for even reasonably good balance, the respective lengths of the arms connecting the filters to the actual junctions must be precisely proportioned with respect to the wavelength or frequency of the energy to be used. Since, in this type of application, it is desired to transmit a relatively broad band of frequencies, prior art four-branch waveguide structures leave much to be desired in that they are precisely balanced only over a relatively narrow frequency band.

Somewhat broader band operation without a serious deterioration of the impedance match at any junction or of the balance of the junction, can be effected by such compensating contrivances as are disclosed, for example, in United States Patent 2,679,582, granted May 25, 1954, to C. F. Edwards.

The necessity for inserting compensating members can be eliminated, by use of the pseudohybrid junction arrangement of the present invention, as will become apparent hereinunder. Also satisfactory operation over a much broader band of frequencies can generally be attained by use of pseudohybrid structures than by use of compensated conventional hybrid structures.

It is therefore an additional object of the present invention to separate a plurality of broad band channels from a single transmission path.

Another object of this invention is to provide a simpler and more readily producible microwave filter structure having a more compact physical configuration.

In accordance with the invention, the foregoing and other related objects and advantages are attained by suitably combining two parallel arm pseudohybrids. Because of the parallel arrangement of all the branch arms, the two parallel arm pseudohybrids may be placed contiguous to each other thus forming a compact array of four waveguides sharing common interior walls and having an overall outside dimension of twice any single waveguide.

The loosely series coupled arm of the first pseudohybrid is connected to the loosely shunt coupled arm of the second pseudohybrid forming a first cavity proportioned to resonate at the center frequency of the particular band to be extracted. Similarly the loosely shunt coupled arm of the first pseudohybrid is connected to the loosely series coupled arm of the second pseudohybrid forming a second cavity similarly proportioned to resonate at the center frequency of the particular band to be extracted.

Energy within the resonant cavity bandwidth transmitted along the through-guide of the first pseudohybrid will excite the cavities and will be substantially completely coupled to the second pseudohybrid. Those frequencies without the cavity passband will be transmitted along the through-guide substantially unaffected.

These and other objects, the nature of the present invention and its various features and advantages will appear more fully upon consideration of the various specific illustrative embodiments shown in the accompanying drawings and analyzed in the following detailed description of these drawings.

Figure 1:
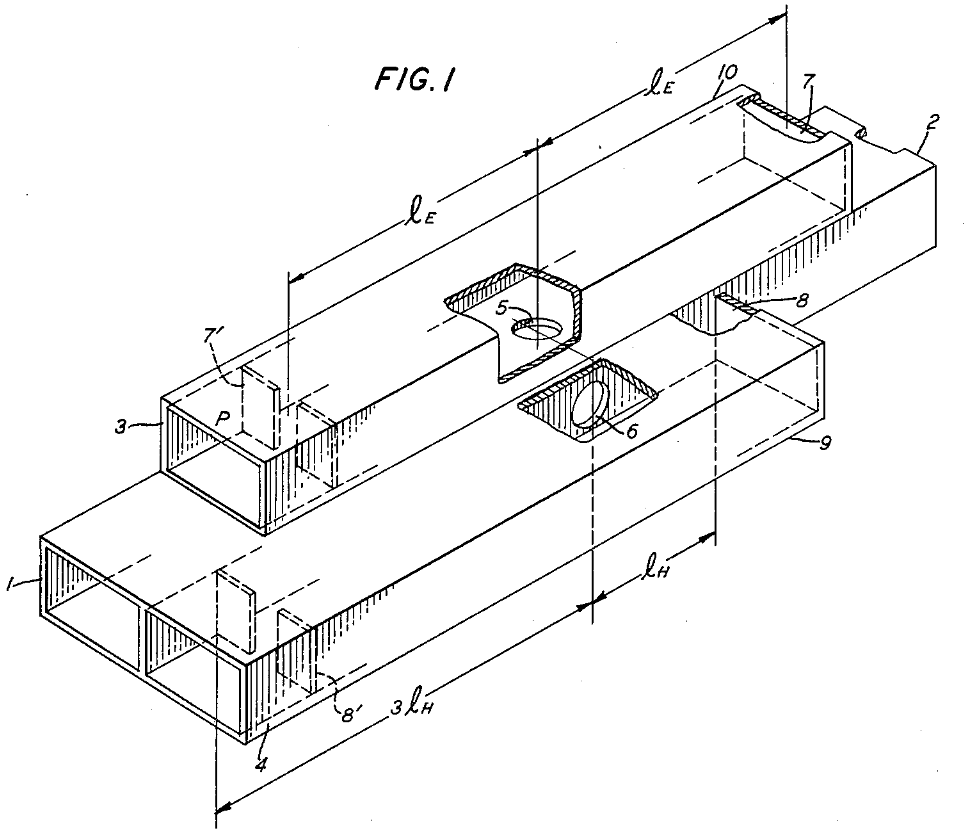
FIG. 1 is a cut-away isometric view of the parallel arm pseudohybrid of the present invention.

Referring now to the accompanying drawings, and more specifically to FIG. 1, there is shown a parallel arm pseudohybrid in accordance with the present invention. This network comprises a first section 1, 2 of bounded electrical transmission line for guiding electromagnetic wave energy which may be a rectangular wave guide of the metallic shield type having a wide internal cross-sectional dimension of at least one-half wavelength of the wave energy to be conducted thereby, and a narrow dimension substantially one-half of the wide dimension. So constituted, this wave guide operates in the dominant mode, known in the art as the $TE_{10}$ mode, in which the electric lines of force extend from the bottom to the top of the waveguide, perpendicular to the wide guide walls. The intensity of the electric field varies sinusoidally along the wide dimension, having a maximum at the center of the guide and being substantially zero at the edges. The intensity of the electric field is uniform along the narrow dimension, but varies sinusoidally along the axis of the guide. The electric and magnetic fields are mutually perpendicular at all points and the magnetic flux lines form closed loops which lie in planes parallel to the wider walls of the waveguide. As such, the high frequency magnetic field has a longitudinally component parallel to the direction of propagation and a transverse field component perpendicular thereto.

Located adjacent to guide 1, 2 and running for a portion of its length contiguous and parallel thereto are a second section of transmission line 3, 10 forming a series branch and a third section of transmission line 4, 9, forming a shunt branch both of which may have the same internal cross-sectional dimensions as guide 1, 2. One wall of guide 3, 10 is placed contiguous to a wide wall of guide 1, 2 to form a common wide wall for both guides whereas guides 4, 9 and 1, 2 share a common narrow wall.

Lines 1, 2 and 3, 10 are coupled to each other through an aperture 5 in the common wide wall. The center of the aperture is located in the plane of the axes of the two guides. Located in the common narrow wall is aperture 6 to couple guides 1, 2 and 4, 9. The center of aperture 6 is located midway between the wide walls of the guide and in the same transverse plane as the center of aperture 5.

In the general case, excitation through an aperture takes place due to the action of an electric field normal to the aperture, and to the magnetic field in the plane of the aperture. Each of these fields produce secondary waves of equal amplitudes which are propagated in the two directions of the branch guide. In the case of a traveling electromagnetic wave in one of the guides, the secondary waves produced by the electric field in one of the directions is in phase opposition with that produced by the magnetic field in the same direction. Because of the different phase relations for the waves excited electrically and magnetically, there is a substantial difference in the intensity between the resultant secondary waves in the two directions in the branch guide. To preclude the possibility of any coupling between apertures 5 and 6, which would tend to destroy the desired conjugacy between guides 3, 10 and 4, 9, it is essential that the secondary waves induced in guide 1, 2, through either aperture, and which are propagated in either direction therein be of equal amplitude. It therefore becomes apparent from the above discussion that the shunt and series loosely coupled arms couple exclusively to magnetic field components in the through-guide.

As described above, aperture 5, between guides 1, 2 and 3, 10, is located in a region of both maximum electric field intensity and maximum transverse magnetic field strength. To avoid generating unequal secondary waves which would tend to destroy the desired conjugacy, guide 10 is terminated by shorting plane 7 at a distance $l_E$ from the center of aperture 5, where $l_E$ is one-half a wavelength of the frequency of the energy to be coupled between guides. Under these conditions standing waves will be set up in guide 10 such that the electric field strength at aperture 5 will be zero, whereas the transverse component of magnetic field will be a maximum. Consequently, coupling between guides will be exclusively due to magnetic means thereby avoiding the undesirable effects of unequal secondary waves.

Aperture 6 on the other hand is located in a region of minimum electric field intensity. Nevertheless, terminating 9 with shorting plane 8 at a distance $l_H$ from aperture 6, where $l_H$ is equal to a quarter of a wavelength of the frequency of the energy to be coupled between the guides, standing waves will be set up in guide 9 such that the longitudinal component of magnetic field will be a maximum at aperture 6.

Coupling apertures 5 and 6 may be circular or rectangular in shape, dimensioned in accordance with well-known design procedure to produce the desired bandwidth as will be indicated below.

To resonate the loosely coupled arms, irises 7' and 8' are placed in guides 3 and 4 respectively. If now, a band of frequencies centered about such frequency for which $l_H$ and $l_E$ represent a quarter and a half wavelength respectively is applied at guide 1 of the through-guide, all the energy will be extracted in equal amount through guides 3 and 4 and none will appear at guide 2. Similarly if energy at these frequencies is introduced into guide 3 it will be extracted in equal amounts from guides 1 and 2, with no energy appearing at guide 4. Similarly, if energy is introduced into guide 4, all of it will be extracted in equal amounts from guides 1 and 2 with no energy appearing at guide 3.

Figure 2:
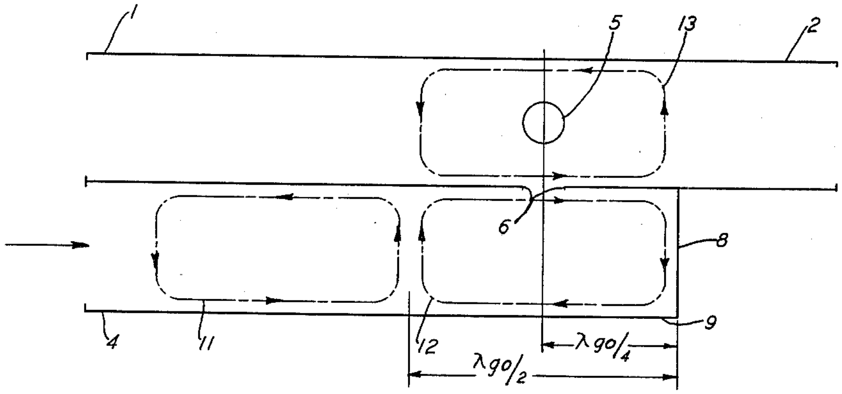
FIGS. 2, 3A and 3B show the magnetic field distribution in the shunt coupled arm of the parallel arm pseudohybrid.

The operation of the pseudohybrid of FIG. 1 may now be explained by considering the field distribution in the various arms of the device. In FIG. 2 the parallel arm pseudohybrid is shown with through-guide 1, 2 and the shunt arm 4, 9, as viewed through the broad face of the guides. Also shown are aperture 6 coupling arm 4, 9 to guide 1, 2 and aperture 5 coupling guide 1, 2 to the series arm, 3, 10, not shown. If electromagnetic energy is introduced into arm 4 standing waves will be set up in arm 4 due to the presence of shorting plane 8. Two of the magnetic R-F field loops for the dominant mode as viewed through the broad face of guide 4, 9 are indicated as 11 and 12. Aperture 6, located a quarter wavelength from plane 8 is located at a point of maximum field strength and will couple energy from guide 4, 9 to through-guide 1, 2, inducing electromagnetic wave energy therein, represented by magnetic R-F field loop 13. The wave energy induced in guide 1, 2 will consist of two waves, one traveling in a direction from 1 to 2 and a second traveling in a direction from 2 to 1.

Figure 3A:
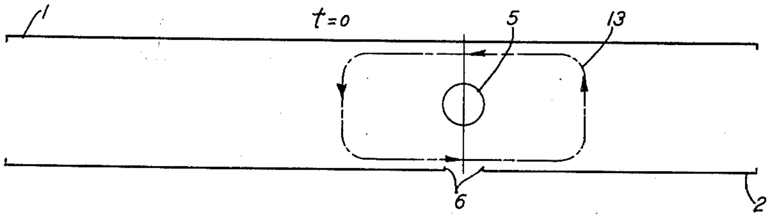
Figure 3B:
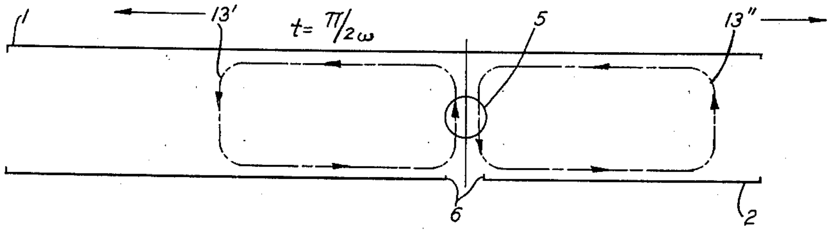

FIGS. 3A and 3B are "snapshots" of the magnetic field loops in guide 1, 2 at two different periods in time. FIG. 3A shows magnetic field loop 13 in guide 1, 2 at a time $t=0$. At this instant, the transverse field at aperture 5 is zero, whereas the longitudinal component at aperture 6 is a maximum, corresponding to a maximum in guide 4, 9, of field loop 12 as shown in FIG. 2. At a time $t=\pi/2\omega$ later, corresponding to the time necessary to travel a quarter of a wavelength, the energy associated with loop 13 will appear as two loops, 13', associated with wave energy being propagated in direction 2, 1, and 13'', associated with wave energy being propagated in direction 1, 2. It will be noted that at this time the net transverse field at aperture 5, consisting of a component from loop 13' directed up in the figure and a component from loop 13'' directed down in the figure continues to be zero. It will also be noted that the longitudinal component at aperture 6 is also zero, corresponding to the value of the longitudinal component of loop 12 in guide 4, 9 which, varying sinusoidally with time, is also passing through its zero value.

Similar "snapshots" may be made for different intervals of time. They will show that the transverse component of magnetic field at aperture 5 remains zero at all times, thereby precluding any coupling from arm 4, 9 to arm 3, 10, which result will similarly be reached in the mathematic analysis presented below.

By a corresponding analysis it can be shown that energy coupled from guide 3, 10 through aperture 5 will at all times result in a zero component of longitudinal field strength at aperture 6, thereby precluding any coupling of energy from guide 3, 10 to guide 4, 9.

To further demonstrate that the structure of FIGURE 1 possesses pseudohybrid properties as defined previously, it will be convenient to consider and analyze several linear, reciprocal, non-lossy structures. These will yield the mathematical tools with which to describe the parallel arm pseudohybrid.

Figures 4, 5, 6:
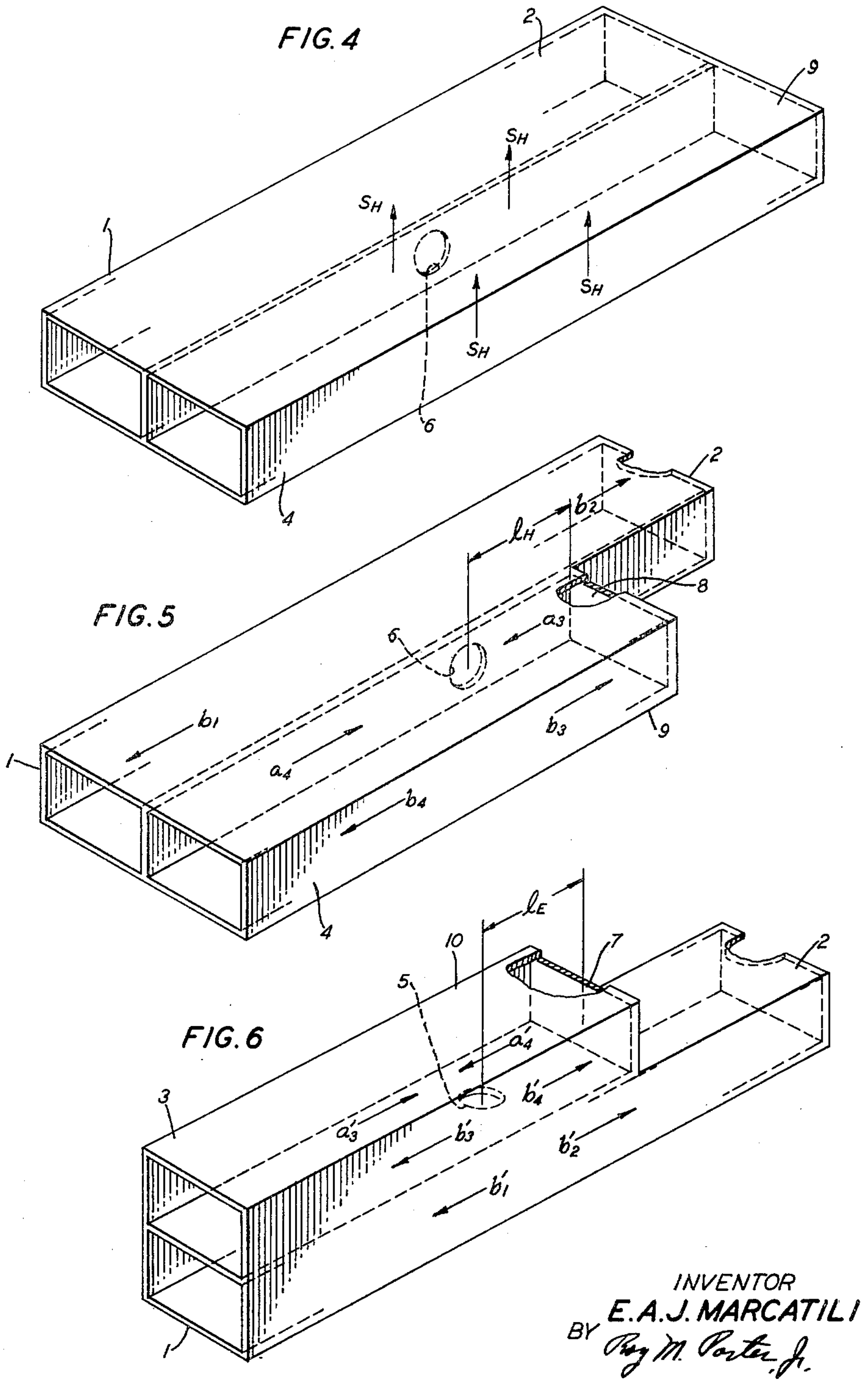
FIGS. 4, 5 and 6 are sections of the parallel arm pseudohybrid, partially cut away, considered in developing the theory of operation of the parallel arm pseudohybrid.

Consider first two infinitely long rectangular wave guides with a narrow wall of zero thicknesss in common, and coupled through a very small hole, as shown in FIG. 4. It is known through Bethe's theory ("Theory of Side Windows in Waveguides," by H. A. Bethe, Radiation Laboratory Report 43-27, April 4, 1943) that a wave of unity intensity traveling in either wave guide 1, 2 or 4, 9 will generate a dipole at the hole 6, that will radiate waves $s_H$ of equal intensity and phase in each one of the four wave guides, if the reference plane is selected perpendicular to the axes of the wave guides and passes through the dipole. The scattering matrix, which is a property of the physical structure, is given as $$[S_H]=\begin{bmatrix} s_H & 1+s_H & s_H & s_H \\ 1+s_H & s_H & s_H & s_H \\ s_H & s_H & s_H & 1+s_H \\ s_H & s_H & 1+s_H & s_H \end{bmatrix} \quad (1)$$

where the general term, $s_{mn}$, is the ratio of the wave leaving the $n^{th}$ guide due to an incident wave of unit amplitude in the $m^{th}$ guide. ("Waveguide Handbook," by N. Marcuvitz, volume 10, M.I.T. Radiation Laboratory Series, pages 106-108.)

By short circuiting guide 9 with conductive member 8 at a distance $l_H$ from the dipole, as shown in FIG. 5, and labeling with $a$'s the waves going toward the dipole and with $b$'s those departing from it, the relations between these waves, expressed in matrix form, are:

$$\begin{bmatrix} b_1 \\ b_2 \\ b_3 \\ b_4 \end{bmatrix}=S_{[H]}\begin{bmatrix} 0 \\ 0 \\ -b_3e^{-j2\theta} \\ a_4 \end{bmatrix} \quad (2)$$

where $a_4$ represents an external signal applied to guide 4, $$\theta=\frac{2\pi}{\lambda_{g_0}}e_H$$

and $\lambda_{g0}$ is the wavelength in the waveguide. From (1) and (2) we obtain $$\frac{b_1}{a_4}=\frac{b_2}{a_4}=s_H\frac{1-e^{-j2\theta}}{1+s_He^{-j2\theta}} \tag{3}$$

$$\frac{b_4}{a_4}=\Gamma_H=\frac{s_H-(1+2s_H)e^{-j2\theta}}{1+s_He^{-j2\theta}} \tag{4}$$

$\Gamma_H$ is, by definition, the reflection coefficient in arm 4. Equation 3 states that arms 1 and 2 are balanced symmetrically independently of $l_H$, that is to say, that the coupled waves $b_1$ and $b_2$ have the same intensity and phase. Incidentally from (3) and (4) it is deduced that when $$l_H=n\frac{\lambda_{g0}}{2}$$

with $n=0, 1, 2 \ldots, \Gamma_H=-1$, and the coupling through the hole is zero, which is natural on account of the fact that when $l_H$ is a multiple of $$\frac{\lambda_{g0}}{2}$$

the conduction current at the location of the hole is zero.

For the special case when $l_H$ is a quarter of the mid-band wavelength in the waveguide, and if the coupling is very small and the bandwidth is very narrow, or in other words, when $$\begin{cases} l_H=\frac{\lambda_{g0}}{4} \\ |s_H|\ll 1 \\ \left|\frac{\pi}{2}-\theta\right|=\frac{\pi}{2}\left|1-\frac{\lambda_{g0}}{\lambda_g}\right|\ll 1 \end{cases} \tag{5}$$

Expressions 3 and 4 become $$\frac{b_1}{a_4}=\frac{b_2}{a_4}\cong\frac{2s_H}{1-s_H}e^{j\left(\frac{\pi}{2}-\theta\right)} \tag{6}$$

$$\frac{b_4}{a_4}=\Gamma_H\cong\frac{1+3s_H}{1-s_H}e^{j2\left(\frac{\pi}{2}-\theta\right)} \tag{7}$$

The relation between real and imaginary parts of $s_H$ can be calculated from the equations of conservation of energy that matrix (1) must satisfy. These equations are:

$$\begin{cases} 3|s_H|^2+|1+s_H|^2=1 \\ 2|s_H|^2+\text{Re } s_H=0 \end{cases} \tag{8}$$

where Re $s_H$ means real part of $s_H$. Solution of (8) yields $$s_H=\frac{j\alpha_H}{1-2j\alpha_H} \tag{9}$$

where $\alpha_H$ is a real number with absolute value much smaller than 1, and is a function of the geometry of the coupling. Carrying (9) to (6) and (7) gives $$\frac{b_1}{a_4}=\frac{b_2}{a_4}\cong\frac{2j\alpha_H}{1-3j\alpha_H}e^{j\left(\frac{\pi}{2}-\theta\right)} \tag{10}$$

$$\frac{b_4}{a_4}=\Gamma_4\cong\frac{1+j\alpha_H}{1-3j\alpha_H}e^{j2\left(\frac{\pi}{2}-\theta\right)} \tag{11}$$

If now two rectangular wave guides 1, 2 and 3, 10 sharing a broad wall of zero thickness, and coupled through a very small hole 5, as shown in FIG. 6, are now considered, it can be shown by a similar treatment that $$\frac{b_1'}{a_3'}=-\frac{b_2'}{a_3'}\cong-\frac{2s_E}{1+s_E}e^{j(\pi-\theta')} \tag{12}$$

$$\frac{b_3'}{a_3'}\cong\frac{-1+3s_E}{1+s_E}e^{j2(\pi-\theta')} \tag{13}$$

where it has been assumed, as before, that $$\begin{cases} l_E=\frac{\lambda_{g0}}{2} \\ |s_E|\ll 1 \\ |\pi-\theta'|=\pi\left|1-\frac{\lambda_{g0}}{\lambda_g}\right|\ll 1 \end{cases} \tag{14}$$

where $l_E$ is the distance from aperture 5 to shorting plane 7. Equation 12 indicates that arms 1 and 2 are balanced asymmetrically or that waves $b_1'$ and $b_2'$ have the same intensity but opposite phase. It is possible to deduce the relation between the real and imaginary parts of $s_E$ from the equations of conservation of energy that must be fulfilled. These equations are $$\begin{cases} 3|s_E|^2+|1-s_E|^2=1 \\ -2|s_E|^2+\text{Re } s_E=0 \end{cases} \tag{15}$$

where Re $s_E$ means the real part of $s_E$. From (15), $$s_E=\frac{j\alpha_E}{1+2j\alpha_E} \tag{16}$$

in which $\alpha_E$ is a real quantity with absolute value much smaller than 1, and is a function of the geometry of the coupling. Substituting Equation 16, in Equations 12 and 13, we obtain $$\frac{b_1'}{a_3'}=-\frac{b_2'}{a_3'}\cong-\frac{2j\alpha_E}{1+3j\alpha_E}e^{j(\pi-\theta')} \tag{17}$$

$$\frac{b_3'}{a_3'}=\Gamma_E\cong\frac{-1+j\alpha_E}{1+3j\alpha_E}e^{j2(\pi-\theta')} \tag{18}$$

Finally, by uniting the basic structures of FIGS. 5 and 6, the structure of FIG. 1 less irises 7' and 8' is obtained. In making this combination, the reference planes used to phase the waves in these structures ares made to coincide.

To demonstrate the conjugate properties of the parallel arm pseudohybrid it is not necessary to include the irises. It may be recalled that the irises were added to resonate the loosely coupled arms in order to effect the maximum transfer of power between the through-guide and the loosely coupled arms. The irises, however, do not in any way contribute to the basic property of conjugacy and in the following comments the reference to FIG. 1 will be made with the understanding that the irises are not present. This will make the mathematical discussion consistent with that developed in reference to FIGS. 5 and 6.

It will now be shown that when arms 1 and 2 are matched, part of the power entering the junction from arm 3 will be reflected (since as has been stated, the irises have not been included in this discussion) and the rest will be equally divided between arms 1 and 2, and similarly part of the power arriving at the junction from arm 4 will be reflected and the rest will also be divided equally between arms 1 and 2.

The most general matrix describing the four port device of FIG. 1 is;

$$[S]=\begin{bmatrix} s_{11} & s_{12} & s_{13} & s_{14} \\ s_{12} & s_{22} & s_{23} & s_{24} \\ s_{13} & s_{23} & s_{33} & s_{34} \\ s_{14} & s_{24} & s_{34} & s_{44} \end{bmatrix} \tag{19}$$

Now, looking from waveguide 1, 2, arm 3 as well as arm 4 appear as symmetrical loads with respect to the plane of reference, and consequently if arms 1, 2 and 4 are matched from Equation 12, it is seen that part of the power fed in 3 will split in antisymmetric waves in arms 1 and 2, that is $$s_{23}=-s_{13} \tag{20}$$

Likewise, if arms 1, 2 and 3 are matched it can be seen from Equation 6 that part of the power fed in 4 will split in symmetric waves in arms 1 and 2. Consequently $$s_{14}=s_{24} \tag{21}$$

It remains only to demonstrate that $s_{34}=0$. Substituting 20 and 21 into matrix 19 gives $$[S]=\begin{bmatrix} s_{11} & s_{12} & s_{13} & s_{14} \\ s_{12} & s_{22} & -s_{13} & s_{14} \\ s_{13} & -s_{13} & s_{33} & s_{34} \\ s_{14} & s_{14} & s_{34} & s_{44} \end{bmatrix} \tag{22}$$

Since the device is lossless, one of the equations of conservation of energy turns out to be $$s_{13}s_{14}^{*}-s_{13}s_{14}^{*}+s_{33}s_{34}^{*}+s_{34}s_{44}^{*}=0 \tag{23}$$

where $$s_{mn}^{*}$$

is the complex conjugate of $s_{mn}$ and consequently $$|s_{34}|[|s_{33}|-|s_{44}|]=0$$

Since, in general, $|s_{33}|$ and $|s_{44}|$ are not equal, $$s_{34}=0 \tag{24}$$

As a consequence of the isolation between arms 3 and 4 just demonstrated, it follows that when arms 1 and 2 are matched, the coupling $s_{13}$ from 3 to 1 is independent of the load in 4, and the coupling $s_{14}$ from 4 to 1 is independent of the load in 3.

A useful pseudohybrid is obtained by making the coupling holes such that $$s_{13}=s_{14} \tag{25}$$

It can then be shown that $$s_{11}=s_{22}=0 \tag{26}$$

Equation 26 states that when arms 2, 3 and 4 of the junction are matched, arm 1 is also matched. This means, that to the first approximations considered, the reflections from the two coupling apertures cancel each other.

Figures 7, 8:
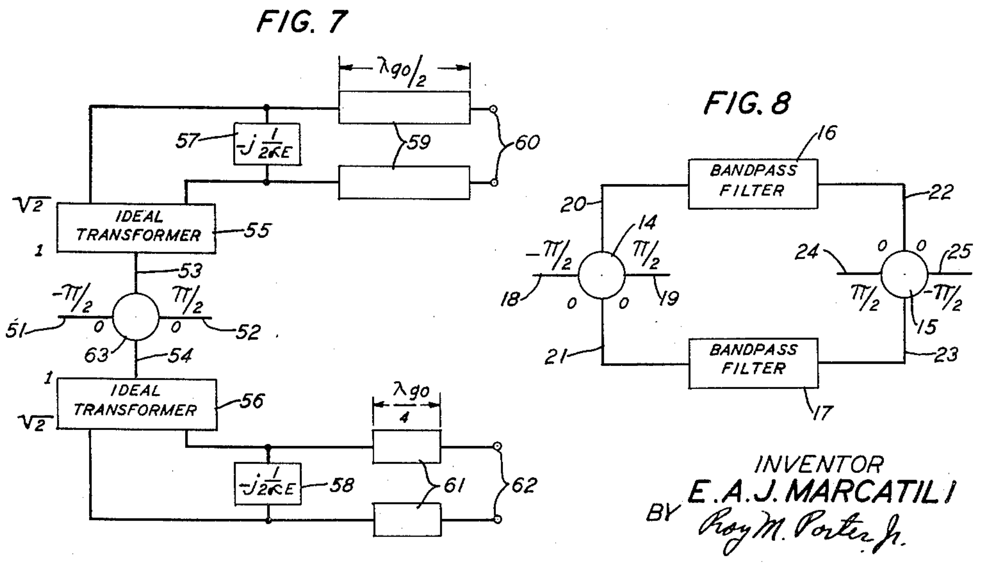
FIG. 7 is the equivalent circuit of the parallel arm pseudohybrid.
FIG. 8 is a block diagram of a channel-dropping filter.

With respect to those resonant frequencies for which $l_E$ and $l_H$ of FIG. 1 represent respectively one-half and one-quarter wavelength, the equivalent circuit of the pseudohybrid may be represented as shown in FIG. 7. It consists of an ideal hybrid 63, with an E arm, 53, coupled through a $1:\sqrt{2}$ ideal transformer 55 to a parallel susceptance 57, and a section of wave guide 59 of length $l_{g0}/2$. The output 60, represents the output of the E arm as viewed at the reference plane looking into the E aperture 5 as in FIG. 1. The H arm 54 is likewise coupled through a $1:\sqrt{2}$ ideal transformer 56 to a parallel susceptance 58 and a section of wave guide 61 of length $l_{g0}/4$. The output 62 represents the output of the H arm as viewed at the reference plane looking into the H aperture 6 as shown in FIG. 1.

While in the above-described structures, the through-guide and the loosely coupled arms have been shown to have the same internal dimensions, and to be arranged parallel to each other, they need not necessarily be so. While the parallel arm arrangement employing guides of equal dimensions is a particularly useful arrangement which represents a preferred embodiment of applicant's invention, where a particular application requires it, the sizes of the several guides may be different and in addition the two coupled arms may be rotated with respect to the through-guide about axes through the centers of the respective coupling apertures 5 and 6, and perpendicular thereto. Such variations will, of course, influence the energy coupled through the coupling apertures and influence their design, but when properly taken into account, will not affect the conjugate properties of the pseudohybrid structure.

*Channel-dropping filters*

As was previously indicated, it is often required to separate many frequency bands or channels from within a single waveguide. Devices for this purpose have been designated channel-dropping filters. It has been found very convenient to design these filters to be non-reflecting at any frequency, and in this case they are called constant resistance channel-dropping filters.

One possible way of making them, as shown in FIG. 8, consists of interconnecting two hybrid junctions 14 and 15, with two identical band-pass filters 16 and 17. A signal, consisting of a number of different frequency bands entering hybrid 14 through arm 18, will divide equally, half the energy passing out through arm 20 and the other half through arm 21. The filters, 16 and 17, being transparent to only a single band, will pass only that band and reflect all others. The transmitted band will enter hybrid 15 through arms 22 and 23, and recombine in arm 25, if the electrical length of the two paths from arm 18 to arm 25, are equal. The rejected bands will reenter hybrid 14 through arms 20 and 21, and recombine in arm 19 if the electrical length of the two paths from arm 18 through hybrid 14 to the two band-pass filters 16 and 17 and back to arm 19 are likewise equal.

The usefulness of such a channel dropping filter is limited to the range of frequencies over which the path lengths described above from input arm 18 to the particular output arm remain electrically equal. In addition, because of the spacial configuration of the hybrid junction, the size of such a filter may preclude its use in situations where space is a problem. One way to circumvent these limitations is to reduce to a minimum the distance from the hybrids to the filters, i.e., by locating the first coupling holes of each band-pass filter in the walls of the through-waveguides, as might be obtained by combining two parallel arm pseudo-hybrids, where the interconnected E and H arms of appropriate length constitute the resonant cavity band-pass filters. As was explained previously, those frequency bands, for which the loosely coupled arms do not resonate, are completely transmitted without interruption, whereas the bands at which the loosely coupled arms do resonate, are completely extracted. A channel dropping filter so constructed is shown in FIG. 9.

Figure 9:
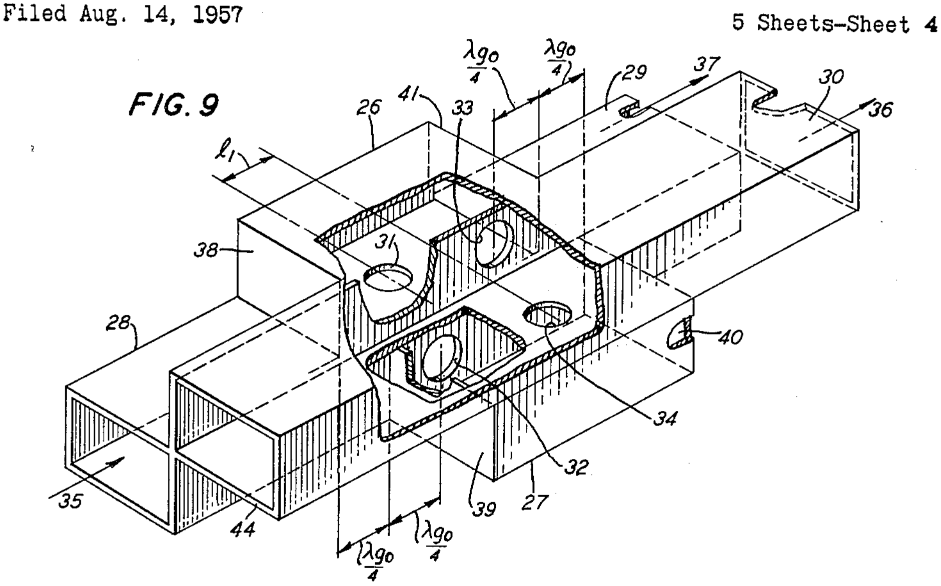
FIG. 9 is a perspective view of a parallel arm pseudohybrid channel-dropping filter.

In FIG. 9, waveguide 28 is the input portion of through-guide 28, 29 of one of the parallel arm pseudohybrids comprising the channel-dropping filter. An input signal entering guide 28 at end 35, as indicated by the arrow, may contain a plurality of communication channels comprising discrete frequency bands in the microwave frequency region. Wave guide 30 is the output portion of through-guide 30, 44 of the second pseudohybrid making up the filter into which it is desired to branch off only one of the plurality of frequency bands being transmitted along wave guide 28. The dropped channel will leave guide 30 at end 36, as indicated by the arrow. The remaining frequency bands will pass through unaffected and exit through guide 29 at end 37, as indicated by the arrow.

The two apertures 31 and 32 on the top and side of wave guide 28 couple the guide to the E and H arms, respectively, of the first pseudohybrid, where these arms now form part of the resonant cavities 26 and 27. Apertures 31 and 32 have their centers in a common transverse plane. End wall 38 of cavity 26 is located at a distance $\lambda_{g0}/2$ from the center of aperture 31 and end wall 39 of cavity 27 is located a distance $\lambda_{g0}/4$ from aperture 32.

Likewise guide 30 has apertures 34 and 33 located in a common transverse plane, which couple the guide to the E and H arms of the second pseudohybrid respectively. As before, these arms now form part of resonant cavities 27 and 26, respectively. Aperture 34 is located $\lambda_{g0}/2$ from end wall 40 of cavity 27 and aperture 33 is located a distance $\lambda_{g0}/4$ from end wall 41 of cavity 26. The reference planes through the two pairs of apertures are spaced a distance $l_1$ which is determined in a manner to be explained below.

As described above, all the frequency bands remote from the resonant frequency of resonant cavities 26 and 27 pass freely along guides 28 and 29 from input end 35, to output end 37. At the resonant frequency of the cavities, however, the energy introduced at 35 is coupled through apertures 31 and 32, into cavities 26 and 27 and out of apertures 33 and 34. The phase relationship is such that the energy recombines in through guide 30, 44 so as to pass out of end 36. The far end of guide 44 may be terminated in an appropriate matched load.

Figure 10:
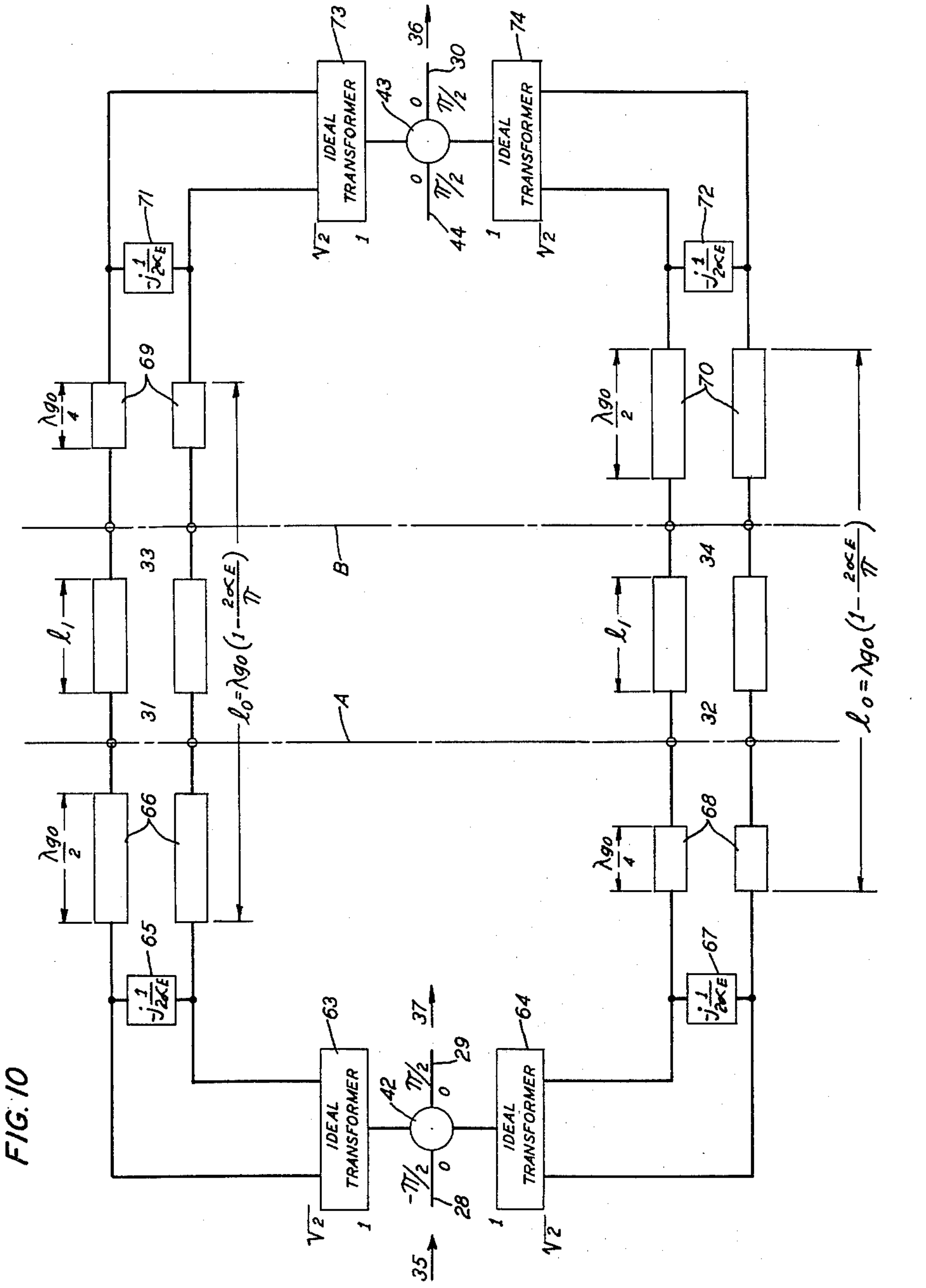
FIG. 10 is the equivalent circuit of the parallel arm pseudohybrid channel-dropping filter.

FIG. 10 is the equivalent circuit of the channel-dropping filter of FIG. 9. It consists of two of the networks of FIG. 7, interconnected by a section of waveguide $l_1$, shown between center lines A and B, which represents the distance $l_1$ between the transverse reference planes through apertures 31 and 32 and 33 and 34 of FIG. 9. The numerical designations of FIG. 9 have been preserved in FIG. 10 wherever possible. Thus a band of frequencies to be dropped entering guide 28 at end 35, as indicated by the arrow, will divide equally in the ideal hybrid 42. Half the energy will enter the equivalent of resonant cavity 26 represented by ideal transformers 63 and 73, susceptances 65 and 71, the line lengths 66, $l_1$ and 69. The other half of the energy will enter the equivalent of resonant cavity 27 represented by ideal transformers 64 and 74, susceptances 67 and 72 and line lengths 68, $l_1$ and 70. The energy will recombine in proper phase in the ideal hybrid 43 and leave through guide 30 as indicated by arrow 36.

Figure 11:
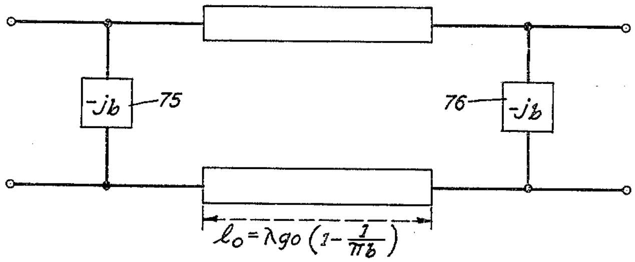
FIG. 11 is a block diagram of a typical band-pass filter.

To determine $l_1$ the length of wave guide between apertures 31 and 33 and 32 and 34, it is convenient to consider a typical band-pass filter as shown in FIG. 11, which consists of susceptance 75 and 76 and line length $l_0$. By comparison it is apparent that $$l_0=\lambda_{g0}/4+\lambda_{g0}/2+l_1=\lambda_{g0}\left(1-\frac{2\alpha_E}{\pi}\right)$$

or $$l_1=\lambda_{g0}\left(\tfrac{1}{4}-\frac{2\alpha E}{\pi}\right) \qquad (27)$$

Because of the presence of the $1:\sqrt{2}$ transformation, however, the apertures are designed so that $$\alpha_E=\frac{1}{\sqrt{2^b}} \qquad (28)$$

Thus, if a conventional band-pass filter is designed in terms of $b$ and $l_0$, the design of the resonant cavities of the pseudohybrid channel-dropping filter follows from Equations 27 and 28.

Figure 12:
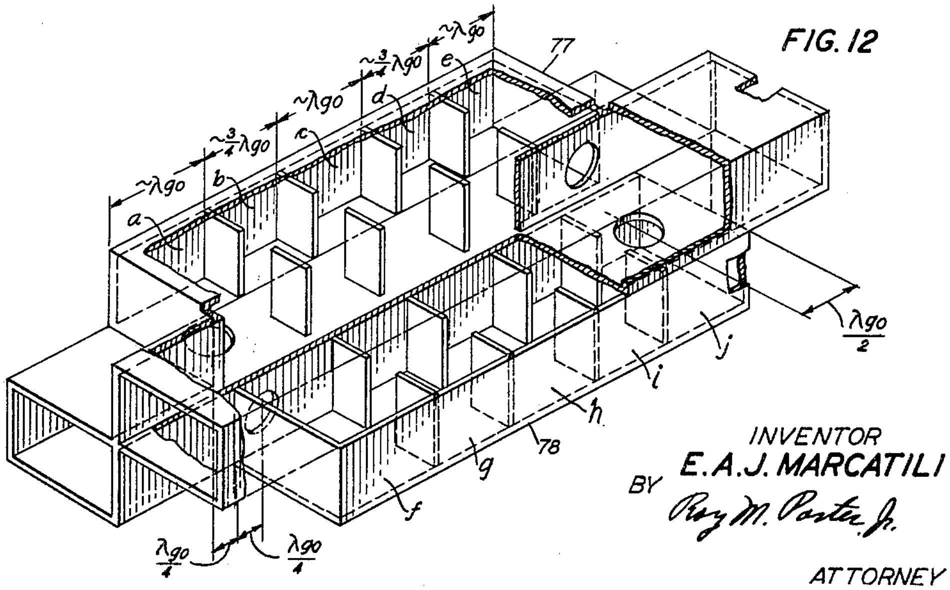
FIG. 12 is a cut-away isometric view of a maximally flat, constant resistance, channel-dropping filter.

In FIG. 12 is illustrated a maximally flat constant resistance channel-dropping filter. This filter is essentially the same as that shown in FIG. 9, wherein the single resonant cavities 26 and 27 have been replaced by the multiple resonant cavities 77 and 78. Each comprises three resonant chambers *a, c, e* and *f, h, j,* coupled through anti-resonant cavities *b, d* and *g, i.* The approximate spacing of the various elements are as shown in the figure.

It is currently known that contemplated waveguide systems will require channel-dropping filters to separate hundreds of bands of the order of 200 mc./sec. wide each, in the 55 kmc./sec. region. Since the number of dropped channels is high, the tolerable reflections from each filter are very low, and since the percentage bandwidth is small, heat losses must be reduced to a minimum. Both requirements are fulfilled by constructing the channel-dropping filters as described above since it is a property of the pseudohybrid that the coupling holes tend to cancel the reactive effects of each other and in addition, the parallel arm pseudohybrid permits one to build the resonating cavities without soldering pieces together.

Two methods of construction have been used. A first method consists in electroforming the resonant cavities. The essential advantage of this method is that the cavities are made without the need for soldered joints in regions of high current densities and consequently heat losses can be kept low.

An alternate method of construction consists in dividing the structure along two parallel planes which are not traversed by appreciable conduction currents. The three resulting sections are then machined from solid stock and bolted together. This method of construction leaves all the cavities and holes accessible and since there are no soldered points, losses in the resonant cavities are minimized.

Both types of filters, the electroformed and the machined have approximately the same intrinsic Q, close to 1000, and their electromagnetic behavior is equally good.

In all cases it is understood that the above-described arrangements are simply illustrative of a small number of the many possible specific embodiments which can represent applications of the principles of this invention. Numerous and varied other arrangements can readily be devised in accordance with these principles by those skilled in the art without departing from the spirit and scope of the invention.

What is claimed is:

1. In an electromagnetic wave energy system, first, second and third sections of rectangular transmission line for supporting said wave energy, said energy as supported in said lines having longitudinally and transversely extending magnetic field components and transversely extending electric field components, said first and second sections being in coupling relationship exclusively to said transversely extending magnetic field components to the exclusion of said electric field components, said first and third sections being in coupling relationship exclusively to said longitudinally extending magnetic field components to the exclusion of said electric field components, and said second and third sections each having one end terminated in a short circuit.

2. The combination according to claim 1 wherein the axes of said sections are parallel.

3. The combination according to claim 1 wherein said first and second sections share a region of a common wide wall and wherein said first and third sections share a region of a common narrow wall.

4. The combination according to claim 3 wherein said coupling relationship between said first and said second section is provided by an aperture in said common wide wall and wherein said coupling relationship between said first and said third section is provided by an aperture in said common narrow wall, the centers of said apertures being located in a common transverse plane.

5. A channel-dropping filter for electromagnetic wave energy including four parallel rectangular wave guides, a first and third wave guide sharing a common wide wall, a second and fourth wave guide sharing a common wide wall, said first and fourth wave guide sharing a common narrow wall, said second and third wave guides sharing a common narrow wall, transverse shorting members terminating the ends of said third and said fourth wave guides forming a first and a second parallelepiped resonant cavity, respectively, of substantially equal dimensions, said second cavity being longitudinally displaced with respect to said first cavity a distance equivalent to a quarter of a wavelength in said guides of the frequency at which said cavities resonate, and means for loosely coupling said cavities to said waveguides, said coupling means comprising a first coupling aperture in said common wide wall between said first guide and said first cavity and a second coupling aperture in said common narrow wall between said first guide and said second cavity, the centers of said first aperture and said second aperture lying in a first transverse plane, a third aperture in said common wide wall between said second guide and said second cavity and a fourth aperture in said common narrow wall between said second guide and said first cavity, the centers of said third aperture and said fourth aperture lying in a second transverse plane, said first plane being located at a distance $\lambda_{g0}/2$ from one end of said first cavity, and said second transverse plane being located at a distance of $\lambda_{g0}/4$ from the other end of said first cavity.

6. A microwave electromagnetic wave transducer comprising a pair of electromagnetic wave resonating structures interconnected between two electromagnetic wave guides, one resonating structure of said pair being loosely coupled in parallel relation with a first of said waveguides and loosely coupled in series relation with the second of said waveguides, the other resonating structure of said pair being loosely coupled in series relation with the first waveguide and loosely coupled in parallel relation with the second waveguide, said parallel relation coupling being located at a point of maximum current in said resonators, and said series relation coupling being located at a point of minimum voltage in said resonators.

7. In an electromagnetic wave transmission system first, second and third sections of rectangular waveguide supportive of a band of frequencies, the first of said sections being joined longitudinally to the second of said sections along a common broad wall, said common broad wall containing a first coupling aperture in a section of said second guide bounded by a first pair of reactive elements each of which is longitudinally spaced from the center of said first aperture by a distance equal to a multiple of half a wavelength of a given frequency within said band of frequencies and the third of said sections being joined longitudinally to said to said first section along a common narrow wall, said common narrow wall containing a second aperture in a section of said third guide bounded by a second pair of reactive elements each of which is longitudinally spaced from the center of said second aperture by a distance equal to an odd multiple of a quarter wavelength of said given frequency, said first and second coupling apertures having their centers located in the same transverse plane.

8. The combination according to claim 7 wherein one of said reactive elements in each of said pairs is a transverse conductive shorting plane and the other of said elements is a conductively bounded iris.

References Cited in the file of this patent

UNITED STATES PATENTS

| | | |
|---|---|---|
| 2,568,090 | Riblet | Sept. 18, 1951 |
| 2,649,576 | Lewis | Aug. 18, 1953 |
| 2,699,547 | Zweigbaum | Jan. 11, 1955 |
| 2,808,573 | Bell | Oct. 1, 1957 |
| 2,820,204 | Wallace | Jan. 14, 1958 |
| 2,823,356 | Miller | Feb. 11, 1958 |